Nov. 3, 1942.  E. B. SLEETER  2,300,708
CONDENSER MOTOR
Filed Nov. 29, 1939
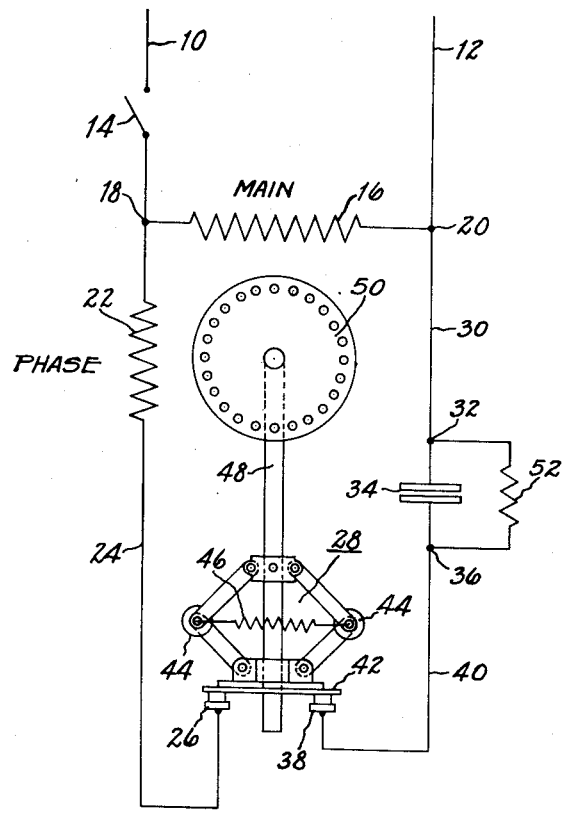
INVENTOR
Edward B. Sleeter
BY
Spencer, Hardman & Fehr
ATTORNEYS Patented Nov. 3, 1942

2,300,708

UNITED STATES PATENT OFFICE 2,300,708

CONDENSER MOTOR

Edward B. Sleeter, Dayton, Ohio, assignor to General Motors Corporation, Detroit, Mich., a corporation of Delaware Application November 29, 1939, Serial No. 306,633

5 Claims. (Cl. 172—279)

This invention relates to electric motors of the condenser-start type, and has for an object to improve the operating characteristics of the same.

In a condenser-start motor, it has been observed that a residual charge is left in the starting condenser which will discharge through the motor winding after the motor is disconnected from the line and has slowed down sufficiently for the centrifugal switch to close. That discharge causes the motor to act as a self excited generator, and results in the motor being noisy in stopping in that it slows down with somewhat of a grunt. It has likewise been observed that a voltage is generated at the motor terminals which may adversely affect the operation of other apparatus, such as relays, solenoid valves and the like, that may be connected in parallel with the motor. When that occurs in oil burning installations it is very objectionable and in the same instances may be hazardous, in that the solenoid valve might be left partially open, permitting leakage.

It is therefore a further object of this invention to effect a substantially complete discharge of the starting condenser before the motor is disconnected from the line.

Another object of the invention is to prevent the residual charge of a condenser from discharging through the motor windings when the motor is disconnected from the line and the centrifugal switch closes.

A further object of the invention is to prevent the motor from acting temporarily as a self excited generator after it is disconnected from the line.

A further object is to eliminate noise of operation as the motor slows down and comes to rest.

A further object of the invention is to prevent the generation of energy during stopping of a condenser start motor that will adversely affect the operation of associated apparatus.

A still further object is to substantially dissipate the residual charge of a motor starting condenser within a short time after disconnecting the same from the circuit, without discharging the same through the motor windings upon reclosing of the automatic switch.

The foregoing objects of the invention are accomplished, and the objections stated are eliminated by placing a resistance across the starting condenser so as to dissipate its charge while the motor is running, and within an appreciably short time after the automatic switch has been opened after completing the starting function.

Further objects and advantages of the present invention will be apparent from the following description, reference being had to the accompanying drawing wherein a preferred embodiment of the present invention is clearly shown.

In the drawing, the single figure illustrates diagrammatically the elements and features of the herein described control circuit.

The leads of a power line are indicated at 10 and 12 one of which is connected with a line switch 14. The motor comprises a main winding 16 connected across the line to the motor terminals 18 and 20, and a phase or starting winding 22 having connection with the motor terminal 18. A lead 24 connects the winding 22 with a fixed contact 26 of an automatic switching mechanism 28. From the terminal 20, a lead 30 connects with a terminal 32 of a motor starting condenser 34, the opposite terminal 36 of which is joined to a second fixed contact 38 of the automatic switch 28 by means of a connector 40.

The automatic switching mechanism 28 disclosed illustrates a centrifugal or speed responsive switch providing a bridging contact 42 spring urged at a condition of rest to cross connect the fixed terminals 26 and 38. As illustrated, the automatic switch comprises flyweights or like devices 44 urged inwardly by spring 46 and all carried by a motor shaft 48 upon which is mounted the usual rotor 50. As the rotor approximates a predetermined or designed speed, the centrifugal mechanism operates to open the circuit connection between the fixed contacts 26 and 38 as is the usual function of such devices, and as is well known to those experienced in the art.

While it is illustrated that the automatic switch 28 comprises a centrifugal or speed responsive mechanism, it is contemplated that other automatic switching means operating for the same functions may be used, and that the expression automatic switching mechanism contemplates magnetically operated switches and thermal current switches and the like that may be used in the same capacity.

As is well known to those experienced in the art, the use of the condenser 34 is for the purpose of producing a difference in phase between the currents flowing in the windings of the motor so as to facilitate self starting of the motor immediately that the line switch 14 is closed. When the motor is started, and the speed of the rotor is in approximation of that speed for which the motor is designed, the automatic switching mechanism 28, regardless of its specific characterization, operates to eliminate the phase winding from the motor circuit, such that the motor thereafter operates wholly in response to the energy impressed upon the main winding 16. In other words, the series connection between the phase winding 22 and the condenser 34 is opened and the condenser 34 is left with a residual charge, the magnitude of which depends upon the point on the impressed voltage wave at which the circuit is opened, and only one of its plates or electrodes connected. Normally, the condenser in this condition is incapable of discharging, but holds its charge in suspension so to speak, until reclosing of the automatic switch, or until some other return connection is made. It appears to be this discharge of the residual charge of the condenser upon reestablishing the second connection, as when the motor slows down for stopping, that gives rise to the objections hereinbefore mentioned.

To eliminate those objections a resistor 52, preferably of the non-inductive type, is connected to the terminals 32 and 36, or in other words shunted across the condenser 34, which permits the condenser within a reasonably short time after disconnection from the phase winding to become sufficiently discharged while the motor is running, and without introducing any of the objections stated. The resistor should be of sufficiently high resistance so as not to effect the starting torque of the motor, but not too high to discharge the condenser within the required, or within a reasonably short time. As one example, Let Q=total charge left in the condenser 34.
Let q=quantity discharged after t seconds through resistor 52.
Let C=capacity of condenser 34=100 mfd.=.0001 farad, and
Let R=resistance required to discharge condenser to 10% of its initial charge in 20 secs.

It is well known that a condenser is discharged through a resistor connected across its terminals in accordance with the following, where $$\frac{q}{Q} = 1 - e^{-\frac{t}{RC}}$$

Substituting assumed values then $$.9 = 1 - e^{-\frac{20}{.0001R}}$$

Transposing and solving.

$$.1 = \frac{1}{e^{\frac{20}{.0001R}}}$$

$$e^{\frac{20}{.0001R}} = 10$$

$$\frac{20}{.0001R} \log e = \log 10$$

$$\frac{20}{.0001R} \times .4343 = 1$$

$$200000 = 2.305R$$

$$R = 86,900 \text{ ohms}$$

This means that under the assumed conditions the condenser 34 would be 90% discharged in a period of twenty seconds from the instant that the automatic switch 28 opens the series connection between the condenser 34 and the phase winding 22. It has been found that discharge of the condenser under those conditions, and within that time is usually sufficient for all practical purposes, and that the residual charge of the condenser will have then been sufficiently dissipated so as not to adversely affect mechanism connected in association with the motor, and will eliminate objectionable noise in stopping.

While the embodiment of the present invention as herein disclosed, constitutes a preferred form, it is to be understood that other forms might be adopted, all coming within the scope of the claims which follow.

What is claimed is as follows:

1. In a capacitor start motor in combination, a main circuit, and an auxiliary circuit for starting purposes, means for energizing and deenergizing both circuits coincidentally, said auxiliary circuit comprising a phase winding, a disconnecting switch and a condenser in series all connected across the main circuit, said disconnecting switch operating independently in response to speed to open said auxiliary circuit, and said condenser being permanently shunted by a resistor of such magnitude as to effect gradual but substantial discharge of the condenser after the auxiliary circuit has been opened, whereby the motor is prevented from acting as a self excited generator after being disconnected from the line, and with the auxiliary circuit closed.

2. In a capacitor motor, a main winding for the motor, means for energizing and deenergizing the main winding, an auxiliary starting winding connected in series with a switch and a condenser across the main winding so as to be energized and deenergized therewith, said condenser being permanently shunted by a high resistance discharge resistor, and means responsive to the speed of the motor for opening the switch above a certain speed.

3. In a condenser start motor, a main stator winding, a phase winding, means for energizing and deenergizing both of said windings, a condenser in series with said phase winding, a high resistance discharge resistor shunted around the condenser, and means responsive to motor speed for disconnecting the phase winding, the condenser and the resistor during running of the motor.

4. In a condenser start motor, a main stator winding, a phase winding, means for energizing and deenergizing both of said windings, a condenser, a normally closed switch connecting the condenser in series with the phase winding, a high resistance discharge resistor connected in shunt about the condenser and adapted to dissipate any effect of the condenser after the phase winding circuit has been interrupted, and means actuated by the motor at a predetermined speed thereof to open the switch and render the phase winding and condenser ineffective.

5. In a condenser start motor having two terminals adapted to be connected to a source of electric energy; a running winding connected across the two motor terminals; a starting winding connected across said two motor terminals; a condenser in circuit with the starting winding, a normally closed switch in the starting winding circuit between the condenser and the starting winding, a high resistance discharge resistor connected in shunt about the condenser, and centrifugal means actuated by the motor for opening the switch to interrupt the starting winding circuit including the condenser during the running operation of the motor.

EDWARD B. SLEETER.